US009245292B2

(12) United States Patent
Schweiger et al.

(10) Patent No.: US 9,245,292 B2
(45) Date of Patent: Jan. 26, 2016

(54) PRODUCT MANAGEMENT USING ELECTRONIC PRICE LABELS

(71) Applicant: Target Brands, Inc., Minneapolis, MN (US)

(72) Inventors: Traci N. Schweiger, Carver, MN (US); Jill S. Runquist, Farmington, MN (US); Itti Jindani, Plymouth, MN (US); Lew Price, Burnsville, MN (US)

(73) Assignee: Target Brands, Inc., Minneapolis, MN (US)

( * ) Notice: Subject to any disclaimer, the term of this patent is extended or adjusted under 35 U.S.C. 154(b) by 407 days.

(21) Appl. No.: 13/836,382

(22) Filed: Mar. 15, 2013

(65) Prior Publication Data

US 2014/0279126 A1  Sep. 18, 2014

(51) Int. Cl.
*G06Q 30/00* (2012.01)
*G06Q 30/06* (2012.01)

(52) U.S. Cl.
CPC ........ *G06Q 30/0641* (2013.01); *G06Q 30/0601* (2013.01)

(58) Field of Classification Search
CPC .............. G06Q 30/00; G06Q 30/0641; G06Q 30/0601
See application file for complete search history.

(56) References Cited

U.S. PATENT DOCUMENTS

| | | | |
|---|---|---|---|
| 5,880,449 A | 3/1999 | Teicher et al. | |
| 5,933,813 A | 8/1999 | Teicher et al. | |
| 6,105,004 A | 8/2000 | Halperin et al. | |
| 6,542,573 B2 | 4/2003 | Schomberg | |
| 7,152,040 B1 | 12/2006 | Hawthorne et al. | |
| 2001/0045893 A1* | 11/2001 | Swartzel | G06Q 10/08 340/572.1 |
| 2002/0139847 A1 | 10/2002 | Goodwin, III | |
| 2002/0167500 A1 | 11/2002 | Gelbman | |
| 2005/0021561 A1 | 1/2005 | Noonan | |
| 2005/0218218 A1* | 10/2005 | Koster | G06F 3/147 235/383 |
| 2007/0181678 A1 | 8/2007 | Nilsson et al. | |
| 2008/0052198 A1* | 2/2008 | Hosokawa | G06Q 30/06 705/28 |
| 2010/0138322 A1* | 6/2010 | Nakamura | 705/28 |

(Continued)

FOREIGN PATENT DOCUMENTS

| | | | | |
|---|---|---|---|---|
| AT | EP 2701099 A1 * | 2/2014 | ............. | G06Q 30/06 |
| EP | 874 324 | 10/1998 | | |
| WO | 2012088246 A1 | 6/2012 | | |

OTHER PUBLICATIONS

"Higher Frequency: Wireless Will Soon Become Even More MultiFaceted and Reach Shoppers' Market Basket More Directly", by Deena M. Amato-McCoy, Supermarket News (Apr. 22, 2002): 45.*

(Continued)

*Primary Examiner* — Anne Georgalas
(74) *Attorney, Agent, or Firm* — Leanne Taveggia Farrell; Westman, Champlin & Koehler, P.A.

(57) ABSTRACT

A method is provided for managing item placement in a store. A count of electronic price labels (EPLs) is sent, by a processor, to a handheld device indicating a quantity of EPLs needed in a select portion of a planogram. An EPL identifier is received, by the processor, from the handheld device for each of the quantity of EPLs equal to the count. An item in the portion of the planogram is linked, by the processor, to each EPL. Placement information is sent, by the processor, to each electronic price label. The placement information corresponds with the linked item and is configured to be rendered on a display of each EPL.

17 Claims, 12 Drawing Sheets

(56) References Cited

U.S. PATENT DOCUMENTS

2010/0161452 A1* 6/2010 Hiruma ............... G06Q 10/087
  705/28
2012/0022913 A1 1/2012 Volkmann et al.

OTHER PUBLICATIONS

ZBD, "ZBD Solutions," http://www.zbdsolutions.com/solutions/index.html, 1 page, at least as early as Feb. 2013.

Custom Justice, "Re: Target =Grey Dot=Done?," http://customjustice.dchallofjustice.com/forums/index.php?topic=1816.0, 1 page, at least as early as Feb. 2013.

Pricer, "Pricer Electronic Shelf labels ESL," www.pricerusa.com, 1 page, at least as early as Feb. 2013.

Office Action from corresponding Canadian Design Application No. 2,809,949, mailed Jun. 25, 2013 (4 pages).

Office Action from Canadian Patent Application No. 2,809,949 mailed Nov. 8, 2013 (5 pages).

* cited by examiner

PRODUCT MANAGEMENT USING ELECTRONIC PRICE LABELS

BACKGROUND

Electronic price labels (EPLs) are electronic display modules that attach to the fronts of display structures in retail stores and provide information about products on the display structures. The electronic display modules include display screens that can use LCD or other display technology. The EPLs also include circuitry for sending and receiving data signals over a network. Such data communication allows the EPLs to be automatically updated whenever attributes of the product, such as the price, change. The network can communicate using radio, infrared or other communication signals, which reduce costs related to managing and displaying accurate product information.

The discussion above is merely provided for general background information and is not intended to be used as an aid in determining the scope of the claimed subject matter. The claimed subject matter is not limited to implementations that solve any or all disadvantages noted in the background.

SUMMARY

A product management system includes a store server configured to access item price information, item placement information and item inventory information and an electronic price label server wirelessly connected to a plurality of electronic price labels. The electronic price label server is configured to relay information from the store server indicative of price information, placement information and inventory information to the plurality of electronic price labels. The electronic price label placement information includes instructions indicative of a distance each electronic price label is to be placed relative to an edge of a display fixture.

A method is provided for managing item placement in a store. A count of electronic price labels (EPLs) is sent, by the store server, to a handheld device indicating how many EPLs are needed in a select portion of a planogram. An EPL identifier is received by the store server from the handheld device for each of a plurality of EPLs. An item in the portion of the planogram is linked, by the store server, to a respective EPL for which an EPL identifier was received. EPL placement information is sent, by the store server, to each EPL for which an EPL identifier was received. The EPL placement information corresponds with a location where the linked item is to be stocked and is configured to be rendered on a display of a respective EPL.

A further method for managing item placement in a store is provided. A count of existing electronic price labels in a planogram is compared by the store server to a new count of electronic price labels in a revised planogram to determine whether there is a net increase in electronic price labels needed in the revised planogram. A count of the net increase of electronic price labels is sent by the store server to a handheld device. A new electronic price label identifier for each electronic price label in the count of the net increase of electronic prices labels is received by the store server from the handheld device. Each existing electronic price label and each new electronic price label is linked by the store server to a respective item in the revised planogram. Respective placement information is sent by the store server to each existing electronic price label and to each new electronic price label. The placement information corresponding with the linked item and is configured to be rendered on a display of the electronic price label.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A product management system in a business or store uses an electronic price label server and electronic price labels connected to the electronic price label server to manage electronic price label placement and inventory in the store. A store server links each item in a planogram to an electronic price label and sends electronic price label placement information to the electronic price label. The electronic price label placement information is rendered on a display of the electronic price label and provides instructions related to a distance the electronic price label is to be placed.

Figure 1:
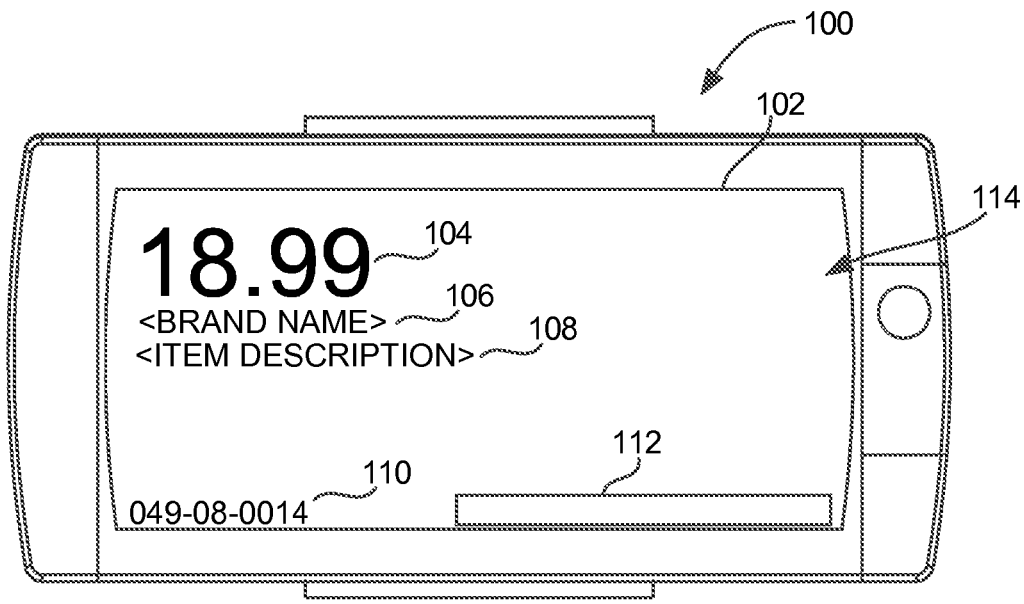
FIG. 1 illustrates a front view of an exemplary electronic price label showing a summary screen on its display.

FIG. 1 illustrates a front view of an exemplary electronic price label (EPL) 100. EPL 100 is an electronic display module that can be attached to a front of a display structure in a retail store, such as a front of a shelf, a peg hook or the like. EPL 100 includes a display screen 102 that uses, for example, LCD or other display technology to display product information, such as the current product price. EPL 100 also includes an internal power source, internal processing circuitry and communication circuitry for sending and receiving data using radio, infrared or other communication signals. The power source and internal circuitry of EPL 100 allows it to switch between screens on display 102 and to be automatically updated with product information. In the embodiment illustrated in FIG. 1, EPL 100 is a dot matrix EPL, which provides paper-like quality graphics such as wide angle viewing and bar code readability. While other types of EPLs are available, such as segmented EPLs, dot matrix EPLs provide complete content flexibility.

As illustrated in FIG. 1, EPL 100 is displaying on display 102 a summary screen 114. Summary screen 114 is the screen presented to customers during normal business hours of a retail store and includes information for an item linked to EPL 100. In the example shown, summary screen 114 includes an item price 104, a brand name 106, an item description 108, an item identifier 110 and a bar code 112 that corresponds with the item identifier 110. Item identifier 110 is a unique identifier assigned to each distinct product or service that can be purchased in a business, such as a retail store.

Figure 2:
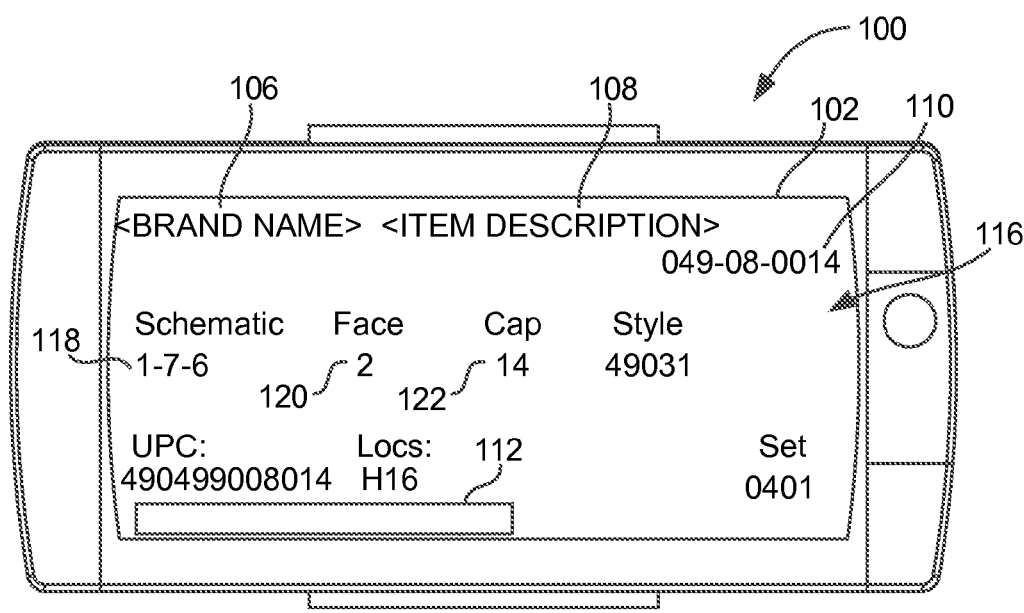
FIG. 2 illustrates a front view of an exemplary electronic price label showing a detailed screen on its display.

FIG. 2 illustrates a front view of EPL 100 displaying on display 102 a detailed screen 116. Detailed screen 116 is the screen presented to employees outside normal business hours of the retail store and communicates detailed information to employees working to stock and label display structures, set product, take inventory and the like. Detailed screen 116 can include information that is displayed on the summary screen 114 including brand name 106, item description 108, item identifier 110, and bar code 112 that corresponds with item identifier 110. However, detailed screen 116 can include additional information important to employees including a position identifier 118 indicative of a position of the item on a planogram or schematic, a face identifier 120 indicative of the number of items of the product that should face out at the customer and a capacity identifier 122 indicative of the total number of items that should be set for the product.

Figure 3:
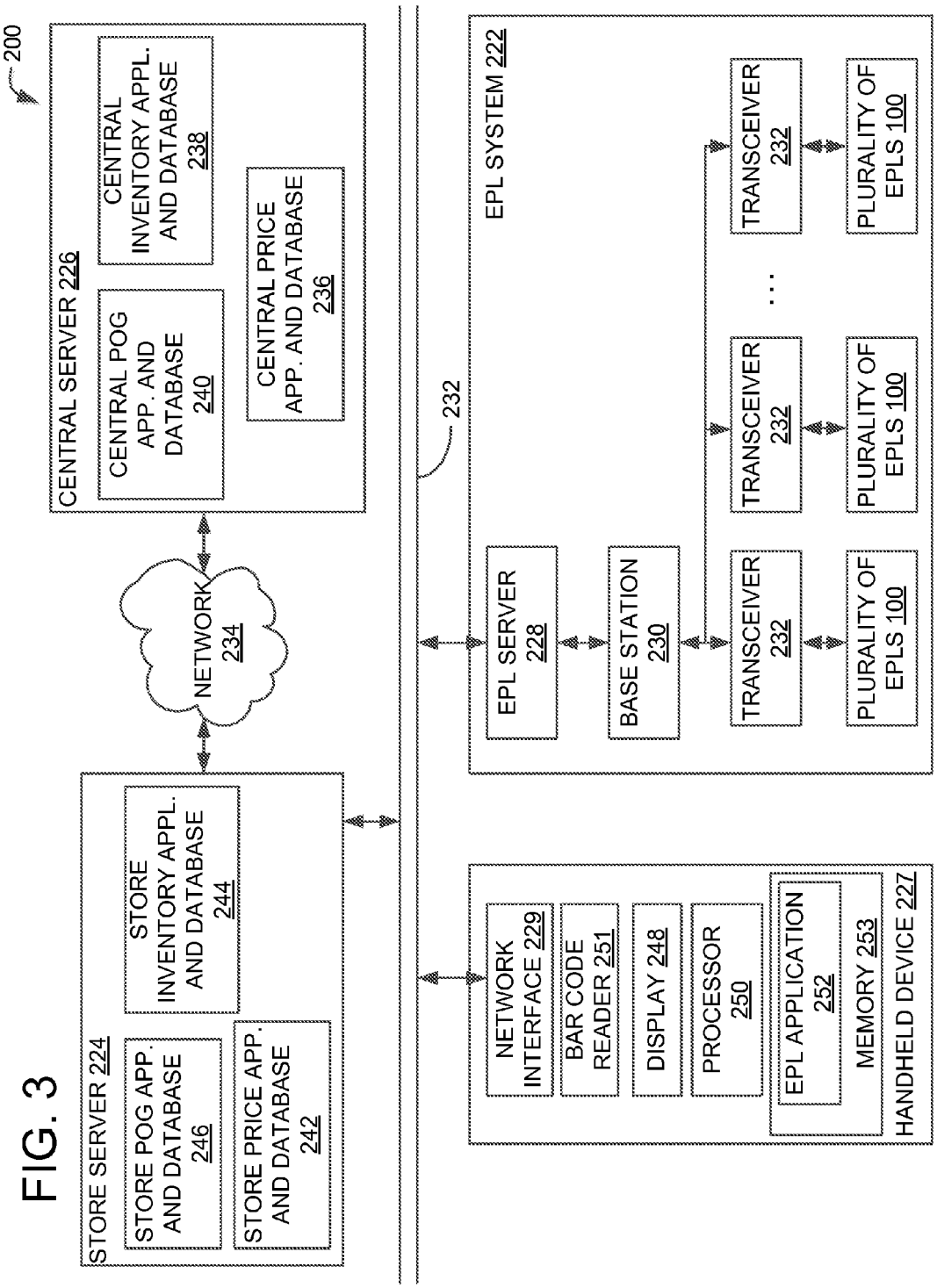
FIG. 3 illustrates a block diagram of a product management system according to one embodiment.

FIG. 3 illustrates a block diagram of a product management system 200 that utilizes EPLs to convey product information including product price to a customer shopping in a business, such as a retail store, according to one embodiment. Product management system 200 includes an electronic price label (EPL) system 222, a store server 224, a central server 226 and a handheld device 227. EPL system 222 includes an EPL server 228 and handheld device 227 includes a network interface 229. EPL server 228, store server 224 and handheld device 229 are connected by a communications network 232, such as a local area network (LAN) or a wide area network (WAN), located in the business, such as the retail store. Communications network 232 provides the necessary environment for communicating data between EPL server 228, store server 224 and handheld device 227. Still further, store server 224 is also connected to another communications network 234, such as the Internet or other secured web-based system. In this way, store server 224 can communicate with central server 226, which manages data across one or more stores in, for example, a retail chain.

EPL system 222 includes EPL server 228, a base station 230, a plurality of transceivers 232 and a plurality of EPLs 100 coupled to each transceiver 232. EPL server 228, which can be a computing device having a processor, manages EPL system 222 and connects EPLs 100 with store server 224. Base station 230 directs data between EPL server 228 and each transceiver 232. Each transceiver 232 is capable of performing bi-directional wireless communication, such as through infrared communication, with each EPL 100 to which it is connected. In other words, each transceiver is capable of communicating with those EPLs 100 that are located within a specific area of the business. For example, each transceiver can be located in the ceiling or other space of the business and is configured to send and receive data to and from those EPLs 100 that are in its assigned area.

As illustrated by display 102 of EPL 100 in FIGS. 1 and 2, exemplary data that can be communicated from store server 224 to EPL 100 and then displayed on EPL 100 includes information related to identifying information for an item, price of an item and information related to position information of an item in the store. In addition and although not illustrated in FIGS. 1 and 2, data related to inventory can also be communicated from store server 224 to EPL 100 and then displayed on EPL 100. As illustrated in FIG. 3, central server 226 has various program modules including a central price application and database 236, a central inventory application and database 238 and a central planogram (POG) application and database 240. Likewise, store server 224 has various corresponding program modules including a store price application and database 242, a store inventory application and database 244 and a store POG application and database 246.

Planograms are visual representations, such as drawings or diagrams, of where each product in a business, such as a retail store, should be placed. These schematics not only present organized position information for merchandise located in particular departments within a business layout, but also includes information on which section and on what shelf, peg hook or the like a product is located. In addition, a planogram can also include information pertaining to facings (i.e., how many items of the product should face out at the customer from the shelf) and capacity (i.e., how many items of the product should be placed on the shelf).

Central price application and database 236 manages the prices of all items being sold by the retail chain and transmits that information to store price application and database 242 on a regular basis. Central inventory application and database 238 manages the inventory of all items in the retail chain and receives and transmits that information to store inventory application and database 244 on a regular basis. Central POG application and database 240 manages all planograms for the retail chain and transmits that information to store POG application and database 246 on a regular basis. Store server 224 supplies EPL server 228 with information related to product price. Therefore, store server 224 can retrieve and send price information from store price application and database 242 to EPL server 228 for each EPL 100 that is associated with an item in the store. Store server 224 can retrieve and send inventory information from store inventory application and database 244 to EPL server 228 for each EPL 100 that is associated with an item in the store. Store server 224 can retrieve and send position information from store POG application and database 246 to EPL server 228 for each EPL 100 that is associated with an item in the store.

Handheld device 227 may be any mobile device such as a mobile phone, a personal digital assistant, a tablet computer or a dedicated handheld device produced specifically for retail applications, for example. Handheld device 227 includes a display 248, a processor 250, a bar code reader 251 and a memory 253 that has stored thereon an EPL application 252. In one embodiment, display 248 can be a touch screen that receives input information from a user. In another embodiment, handheld device 227 can include a separate input, such as a keypad. Processor 250 is configured to run EPL application 252, receive information via network interface 229, receive input from a user, transmit information through network interface 229 and display information on display 248. Memory 251 is a computer-readable storage medium and can be implemented as a rotating storage medium, flash memory, ROM, RAM, or EEPROM for example.

Figure 4:
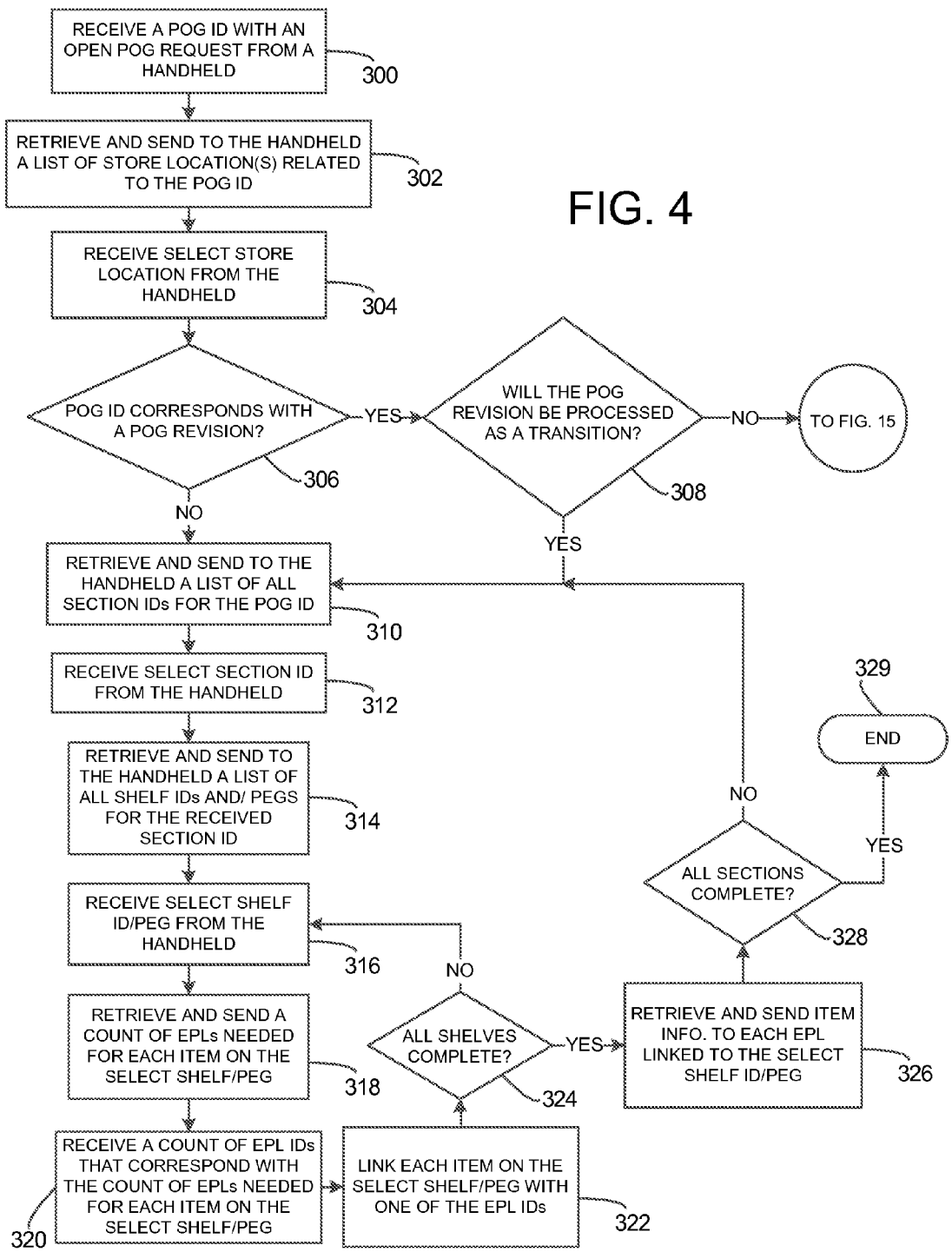
FIG. 4 is a flow diagram illustrating a method of managing electronic price label positioning in a store using the system illustrated in FIG. 3 according one embodiment.
Figure 5:
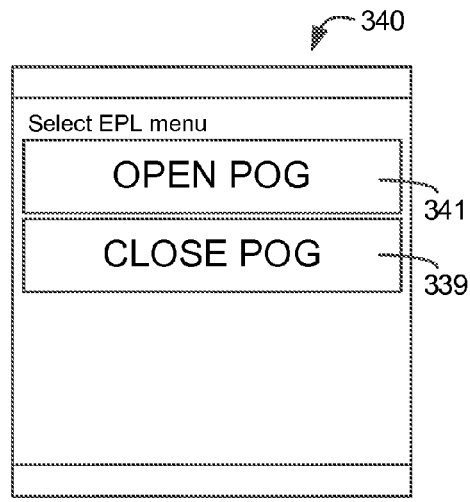
FIGS. 5-10 are screen shots from a display of the handheld device illustrated in FIG. 3 while the method illustrated in FIG. 4 is being performed.
Figure 6:
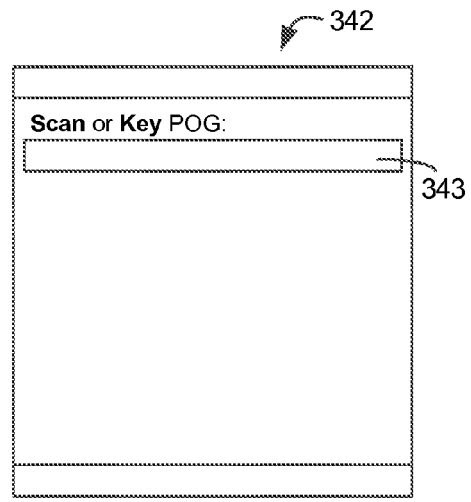

FIG. 4 illustrates a flow diagram of a method implemented by store server 224 for managing EPL placement in a business or retail store using EPL system 222 according to one embodiment. In particular, FIG. 4 illustrates a method of placing EPLs during the processing a POG transition. At block 300, store server 224 receives a planogram (POG) identifier (ID) with an open POG request from handheld device 227. The POG ID and open POG request are sent from handheld device 227 by EPL application 252, which is executed by processor 250. EPL application 252 generates the request based on interactions with a user through display 248. Specifically, as shown in FIG. 5, EPL application 252 displays a user interface 340 on display 248 so that the user can select between opening a POG and closing a POG. When the user selects OPEN POG icon 341, EPL application 252 generates user interface 342 of FIG. 6 on display 248. User interface 342 includes a POG text field 343 for entering the POG ID related to a particular POG. In one embodiment, the POG ID may be printed as a bar code on a label that is attached to a display fixture. In this embodiment, handheld device 227, which includes a bar code reader 251 that scans the bar code causing the POG ID to appear in text field 343. In another embodiment, the user can manually key-in the POG ID.

Figure 7:
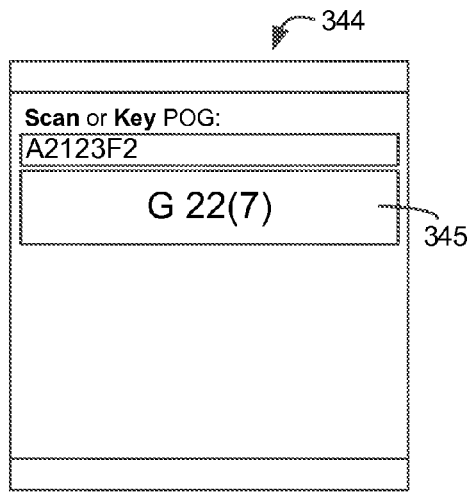

At block 302, store server 224 retrieves a list of store location(s) related to the received POG ID from store POG application and database 246 and sends the list of store locations(s) to handheld device 227. In some instances, the same POG is used in multiple locations in a store. As such, the user must choose or select which of locations in the store that the user is about to transition or revise using the particular POG. Based on the store location(s) received from store server 224, EPL application 252 displays a user interface 344 (FIG. 7) that provides a list of selectable store location(s). In the embodiment illustrated in FIG. 7, the particular POG that the user is to transition or revise includes only one selectable store location 345 in the store. That location is block G, aisle 22, $7^{th}$ section of the aisle. When a user selects a selectable store location from user interface 344, EPL application 252 sends the selected store location to store server 224.

At block 304, store server 224 receives the selected store location from handheld device 227 and determines, at block 306, whether the POG ID corresponds with a POG revision. A POG revision occurs where some but not all items in an existing POG are being removed or replaced, or where additional items are being added to an existing POG. If items are being removed, the EPLs for those items are linked to a different item in the POG or removed and other EPLs may need to be shifted to new positions. If items are being added, EPLs that are associated with removed items can be used or additional EPLs will need to be added to the location for those additional items. For items that are not impacted by the POG revision, the EPLs for those items continue to be linked to those items and are not moved. If the POG ID corresponds to a POG revision, the flow diagram proceeds to block 308. If the POG ID corresponds to a POG transition, the flow diagram proceeds to block 310. A POG transition occurs when all of the EPLs in the location are to be unlinked from their current items and relinked to new items or relinked to the items they were unlinked from.

Figure 8:
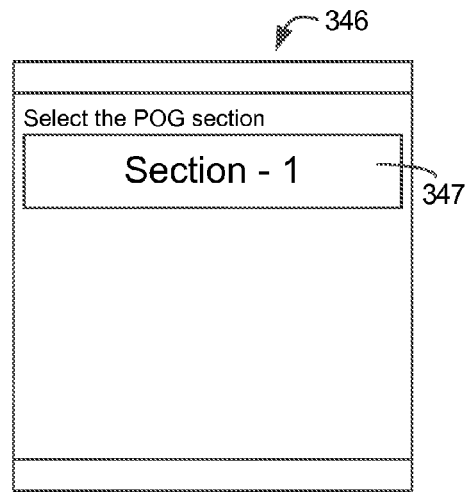

At block 310, store server 224 retrieves a list of all sections for the POG ID from store POG application and database 246 and sends the list of sections for the POG ID to handheld device 227. It should be noted that sections of a POG are different from sections of a location in the store. For example, an item in a store can be located in the store in a block, aisle and aisle section. How that item should be arranged in that block, aisle and section location is dictated by the POG, which describes the item as being in a POG section, on a POG shelf or peg and positioned on the POG shelf or peg at a certain distance. FIG. 8 illustrates a user interface 346 produced by EPL application 252 that renders a list of selectable section identifiers (IDs) provided by server 224. In the embodiment illustrated in FIG. 8, the particular POG that the user is to transition includes only one section corresponding to only one selectable section ID 347. When the user selects a selectable section ID, EPL application 252 forwards the section ID to store server 224.

Figures 9, 10:
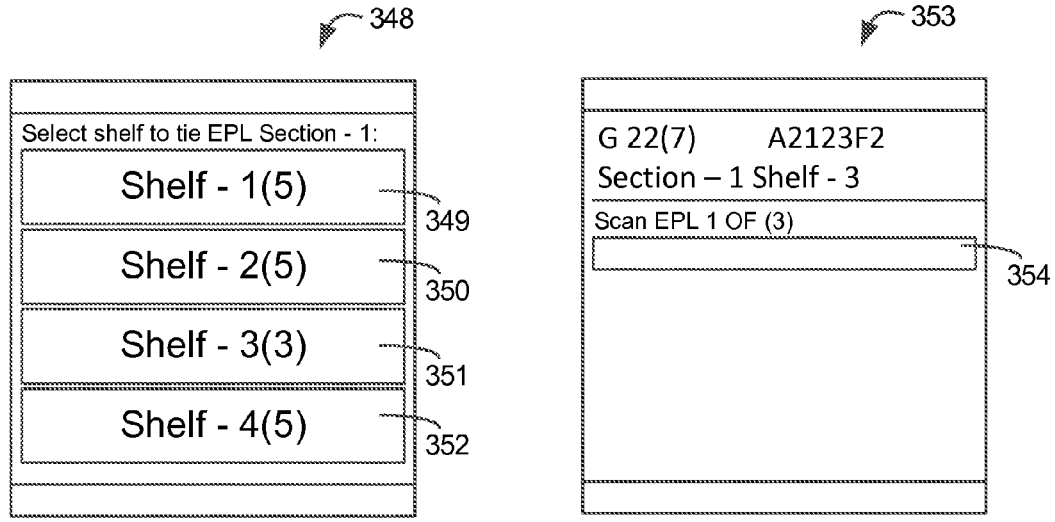

At block 312, store server 224 receives the selected section ID from handheld device 227. At block 314, store server 224 retrieves a list of all shelves and or pegs for the section ID from store POG application and database 246 and sends the list of shelves and or pegs to handheld device 227. FIG. 9 illustrates a user interface 348 produced by EPL application that renders the list of selectable shelf identifiers and or pegs provided by store server 224. In the embodiment illustrated in FIG. 9, the particular POG that the user is to transition includes four shelves corresponding to four selectable shelf IDs 349, 350, 351 and 352. When the user selects a selectable shelf ID or peg, EPL application 252 forwards the shelf or peg to store server 224.

Figure 11:
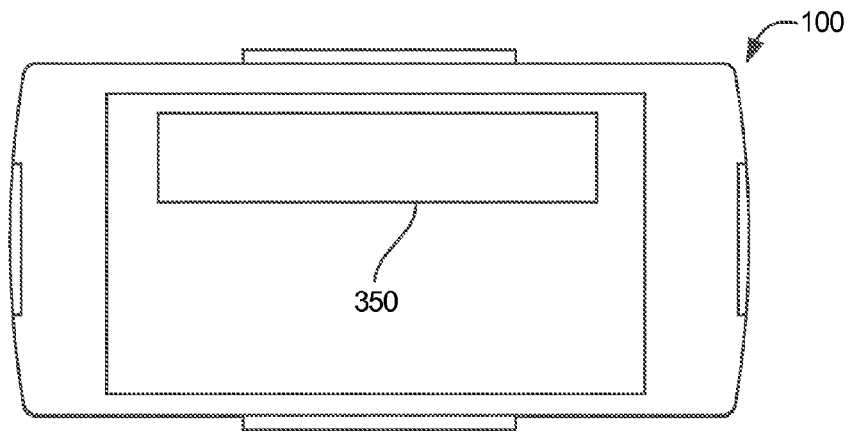
FIG. 11 illustrates a back view of an exemplary electronic price label showing a bar code.

At block 316, store server 224 receives the selected shelf or peg from the handheld device 227. At block 318, store server 224 retrieves a count of EPLs that are needed for each item on the selected shelf ID or peg from store POG application and database 246 and sends the count needed to handheld device 227. If the count is greater than zero, EPL application 252 generates a sequence of user interfaces in which it sequentially asks the user to scan bar codes on the backs of EPLs until a quantity of EPLs has been scanned that matches the count of EPLs provided by store server 224. FIG. 10 illustrates an example of a first user interface 353 in the sequence of user interfaces that EPL application 252 renders. As shown, user interface 353 includes a fillable field 354 that is automatically filled with an EPL ID when the user scans a barcode on the back of the EPL using barcode reader 251 of handheld device 227. In one embodiment, the EPL ID may be printed as a bar code on a label that is attached to a back of an EPL. Such a bar code 350 is illustrated on the back of an EPL 100 illustrated in FIG. 11. EPL 100 of FIG. 11 is currently not linked with any items in the store. When the quantity of scanned EPLs matches the count of needed EPLs provided by store server 224, EPL application returns the list of scanned EPL IDs to store server 224. At block 320, store server 224 receives the EPL IDs that correspond with the count of EPLs needed for the selected shelf or peg.

At block 322, store server 224 links each item on the selected shelf or peg with one of the received EPL IDs. At block 324, store server 224 determines if all shelves and or pegs for the selected section ID are complete. If not all shelves and or pegs are complete, the flow diagram proceeds back to block 316 to receive another shelf ID or peg from handheld device 227. If all shelves and or pegs are complete, the flow diagram proceeds to block 326. At block 326, store server 224 retrieves item information for each linked EPL and sends the item information to those EPLs via EPL server 228. As illustrated in the flow diagram, store server 224 accesses store POG application and database 246 to retrieve item information that is sent to each linked EPL for the select section ID.

Figure 12:
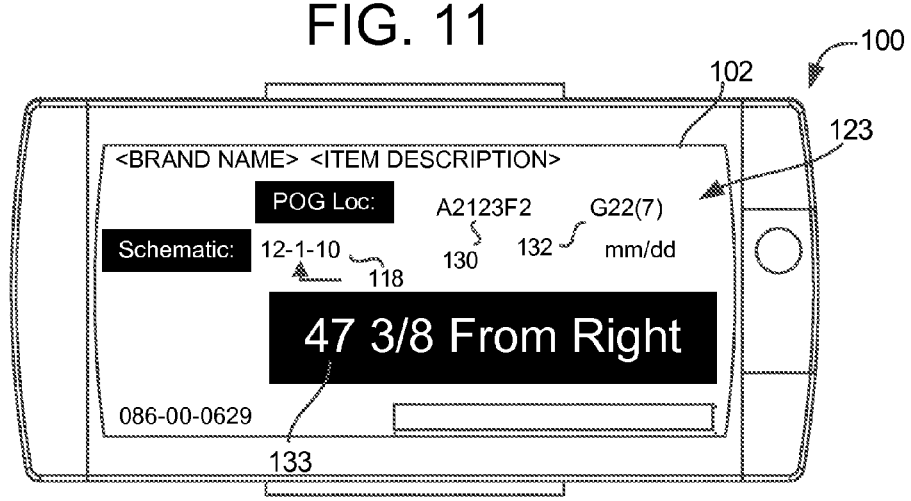
FIG. 12 illustrates a front view of an exemplary electronic price label showing a planogram screen on its display.

At block 326, item information includes the brand and description of the item, POG location information, POG information and EPL placement information. FIG. 12 illustrates a front of an EPL 100 including display 102. Upon store server 224 sending item information, display 102 renders a detailed POG screen 123. POG screen 123 conveys a POG ID 130, store location information (i.e., block, aisle, section) 132, a position identifier 118 of the item in the POG, and specific instructions 133 on placement of the EPL. Position identifier 118 indicates a section of the POG, a shelf or peg of the POG and an order of the item in that shelf or peg. As illustrated in FIG. 12, specific instructions 133 on where the EPL should be placed is indicative of 47⅜ inches from the right edge of the shelf. It should be realized that in some instances, the instructions on where the EPL should be placed can describe a distance from the left edge of the shelf. Regardless, all placement information and instructions is conveyed by display 102 on EPL 100 without need to consult a POG layout. In another example, the specific instructions on where the EPL should be placed can be given in terms of a letter and a number. The letter, such as the letter U, indicates that the EPL should be placed on the peg that is in the 21$^{st}$ hole on the peg board from the left (since U is the 21$^{st}$ letter of the alphabet) and the number, such as the number 66, indicates that the EPL should be placed 66 inches from the bottom of the gondola display fixture. In another example, "GG from Left: 60"" indicates that the EPL should be placed in the 33$^{rd}$ hole from the left and 60 inches from the bottom of the gondola display fixture.

With reference back to FIG. 5, after the user has placed all EPLs associated with a POG ID, the user can select CLOSE POG icon 339. By doing so, the user is directing EPL application 252 to generate a request to store server 224 to convert all display screens on EPLs associated with a POG ID back to a summary screen that a customer views during normal business hours. If, for example, the user fails to select the CLOSE POG icon 339 after performing a transition or revision, store server will automatically convert all display screens in the store to a summary screen before normal business hours begin.

Figure 13:
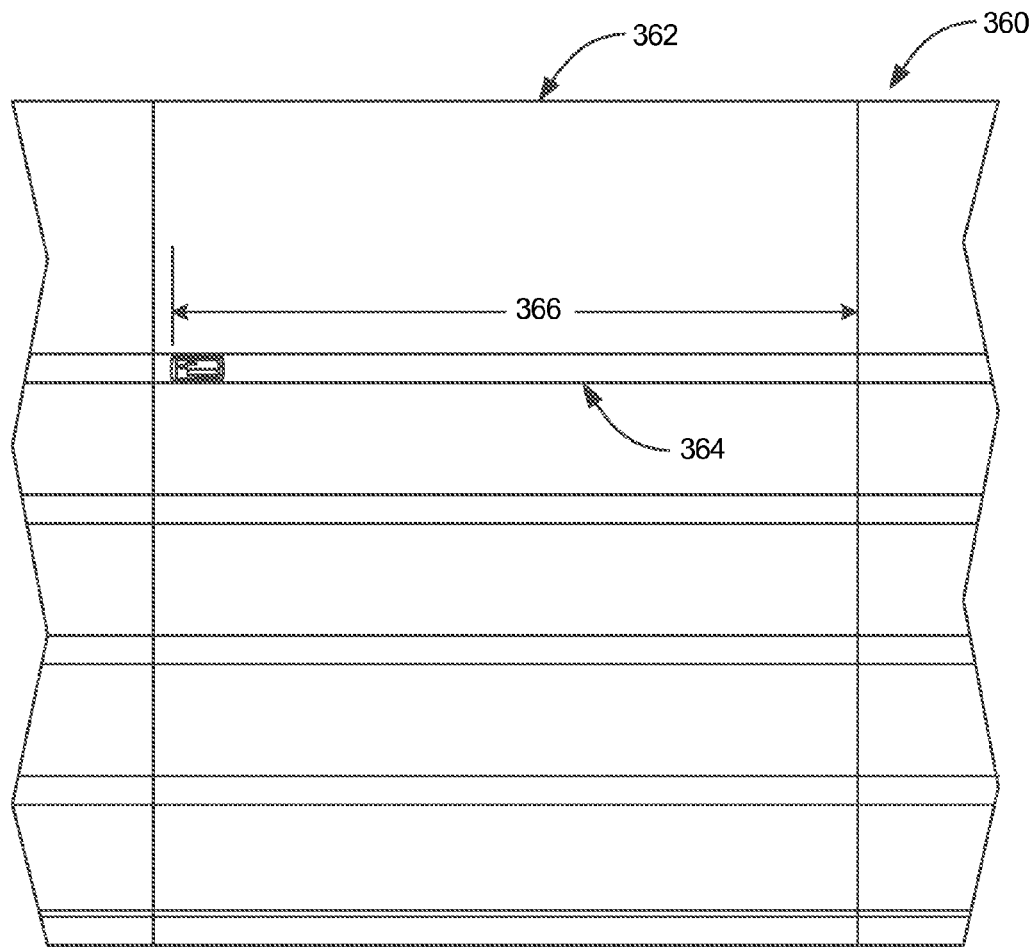
FIG. 13 illustrates a front view of a display fixture in a store.

FIG. 13 illustrates a front view of a display fixture 360. Display fixture 360 includes a plurality of shelves. With reference to display screen 123 on EPL 100 of FIG. 12, the item that corresponds with the EPL should be located in the store at block G, aisle 22, aisle section 7. At this store location, the EPL belongs to section 12 (indicated by lead line 362), shelf 1 (indicated by lead line 364) and be the 10$^{th}$ item on the shelf. At this position in the POG, the EPL should be placed on the shelf at a distance 366 that is 47⅜ inches from the right edge of section 12.

At block 328, store server 224 determines if all sections of the select POG ID are complete. If all sections are complete, the flow diagram ends. If not all sections are complete, the flow diagram proceeds back to block 310 to receive another section ID. When all the sections are complete, the process ends at step 329.

Figure 14:
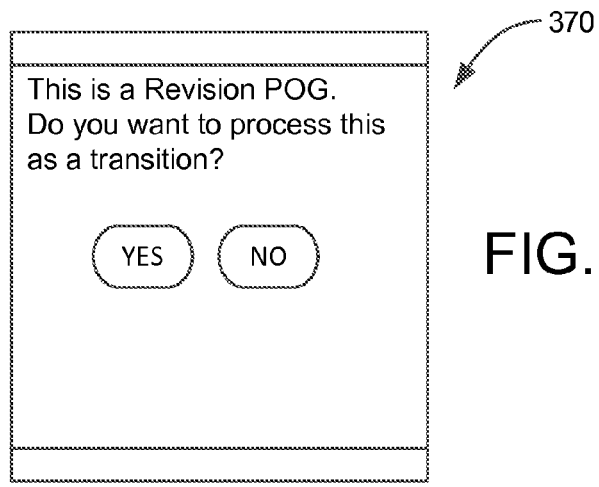
FIG. 14 is a screen shot from the display of the handheld device illustrated in FIG. 3 while the method illustrated in FIG. 4 is being performed.

With reference back to block 308, if the received POG ID corresponds to a revision, the flow diagram proceeds to block 308 and determines whether the POG revision will be processed as a transition. Processing a revision as a transition is a choice that the user can make. FIG. 14 illustrates a user interface 370 provided by EPL application 252 that allows the user to process a revision as a transition. The user makes the decision and that decision is sent to store server 224 from handheld device 227 by EPL application 252. For example, if the user believes that the revision involves too many changes to EPLs, the user may decide to process the revision as a transition and therefore, relink all of the EPLs on a shelf-by-shelf or peg-by-peg basis. If the user decides to process the revision as a revision, then the flow diagram proceeds to block 400 in FIG. 15.

Figure 15:
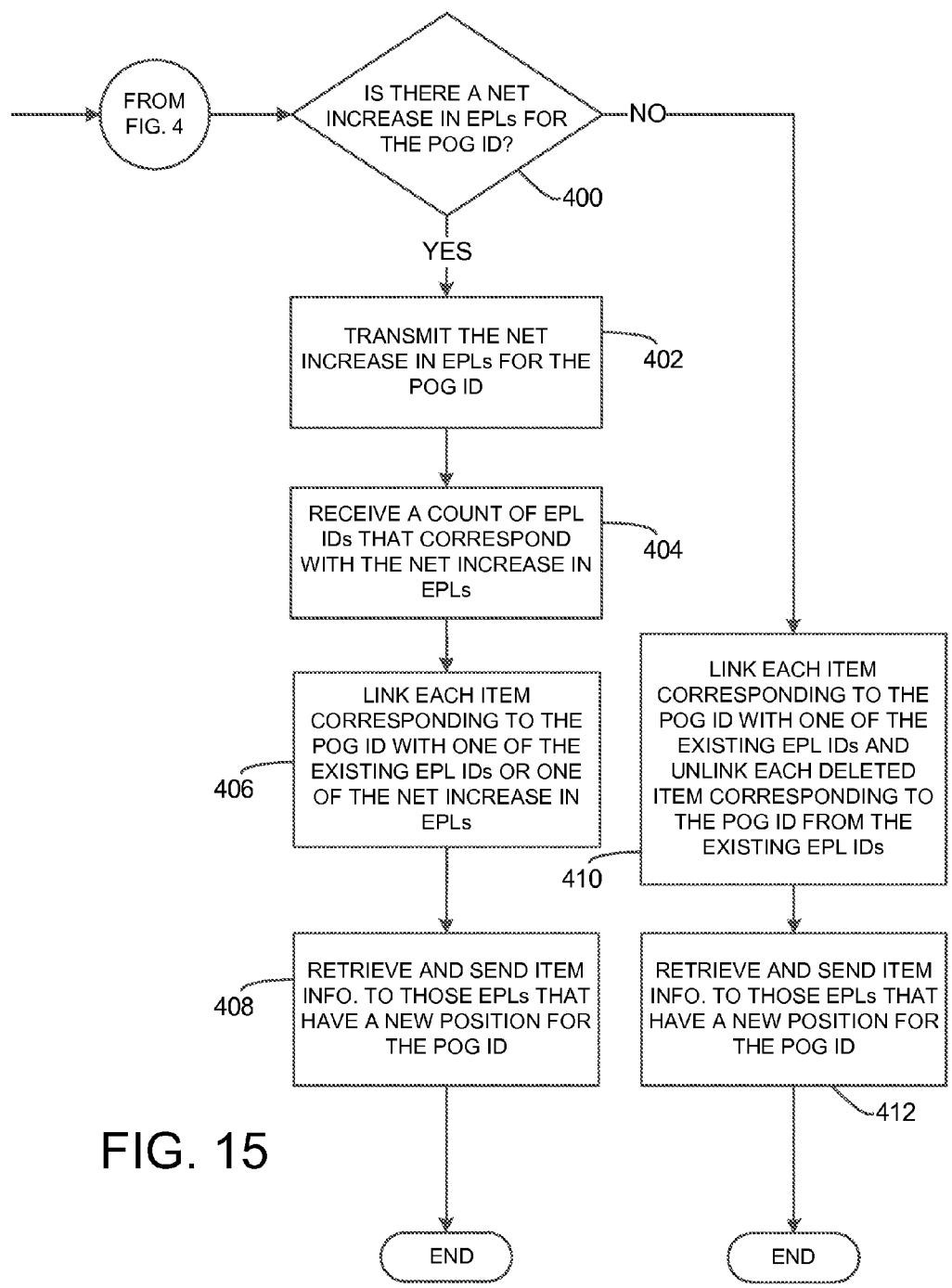
FIG. 15 is a flow diagram illustrating a method of managing electronic price label positioning in a store using the system illustrated in FIG. 3 according to one embodiment.

FIG. 15 illustrates a flow diagram of a method implemented by store server 224 for managing product positioning in a business or retail store using EPL system 222 according to one embodiment. In particular, FIG. 15 illustrates a method of processing a POG revision. At block 400, store server 224 determines if there is a net increase in EPLs for the POG ID. If there is a net increase, store server 224 proceeds to block 402. If there is not a net increase, store server 224 proceeds to block 410.

At block 402, store server 224 transmits the net increase in EPLs for the POG ID to handheld device 227. Handheld device 227 renders a sequence of screens similar to user interface 353 illustrated in FIG. 10 so that the user can enter EPL IDs for each of the net increase in EPLs. When all of the needed EPL IDs have been scanned, EPL application 252 sends the EPL IDs to store server 224. At block 404, store server 224 receives the EPL IDs that correspond with the count of EPLs needed to satisfy the net increase.

At block 406, store server 224 links each item corresponding to the POG ID with one of the existing EPL IDs or one of the net increase in EPLs. At block 408, store server 224 retrieves item information for each linked EPL and sends the item information to those EPLs via EPL server 228. As previously described item information includes the brand and description of the item, POG location information, POG information and EPL placement information. As illustrated in the flow diagram, store server 224 accesses store POG application and database 246 to send item information to each linked EPL for the select section ID. Upon sending item information, each EPL displays a POG screen like POG screen 123 illustrated in FIG. 12.

If there is no net increase in EPLs, at block 410, store server 224 links each item corresponding to the POG ID with one of the existing EPL IDs and unlinks each deleted item (if any) corresponding to the POG ID from the existing EPL IDs. At block 412, store server 224 retrieves item information for each linked EPL and sends the item information to those EPLs via EPL server 228. Upon receiving the item information, each EPL displays a POG screen like POG screen 123 illustrated in FIG. 12. After step 408 or step 412, the process ends.

Figure 16:
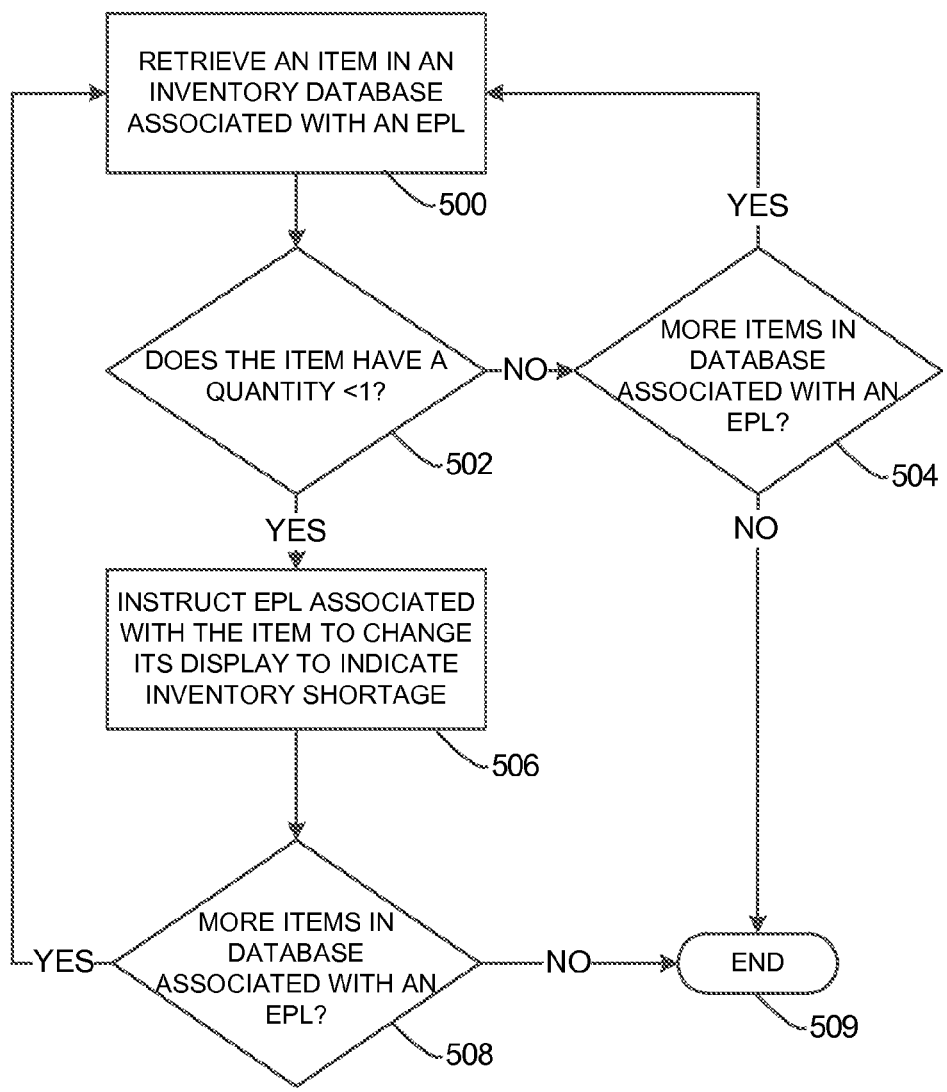
FIG. 16 is a flow diagram illustrating a method of managing inventory in a store using the system illustrated in FIG. 3 according to one embodiment.

FIG. 16 illustrates a flow diagram of a method implemented by store server 224 for managing product inventory in a business or retail store using EPL system 222 according to one embodiment. In particular, FIG. 16 illustrates a method of changing an EPL screen to reflect an inventory shortage. At block 500, store server 224 retrieves an item in store inventory application and database 244 that is associated an EPL. At block 502, store server 224 determines whether the item has an inventory quantity of less than one. If not, the flow diagram proceeds to block 504. If so, the flow diagram proceeds to block 506. At block 504, if more items in the database are associated with an EPL, then the flow diagram returns to block 500 to retrieves an item in the inventory database that is associated with a different EPL. At block 504, if no more items in the database are associated with an EPL, then the process ends at step 509.

Figure 17:
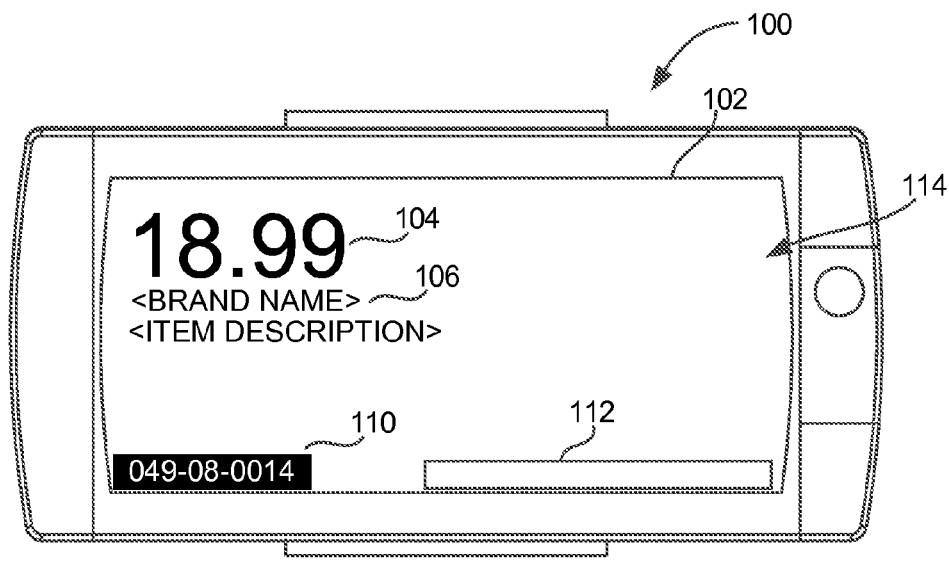
FIG. 17 illustrates a front view of an exemplary electronic price label showing an inventory shortage on a summary screen on its display.
Figure 18:
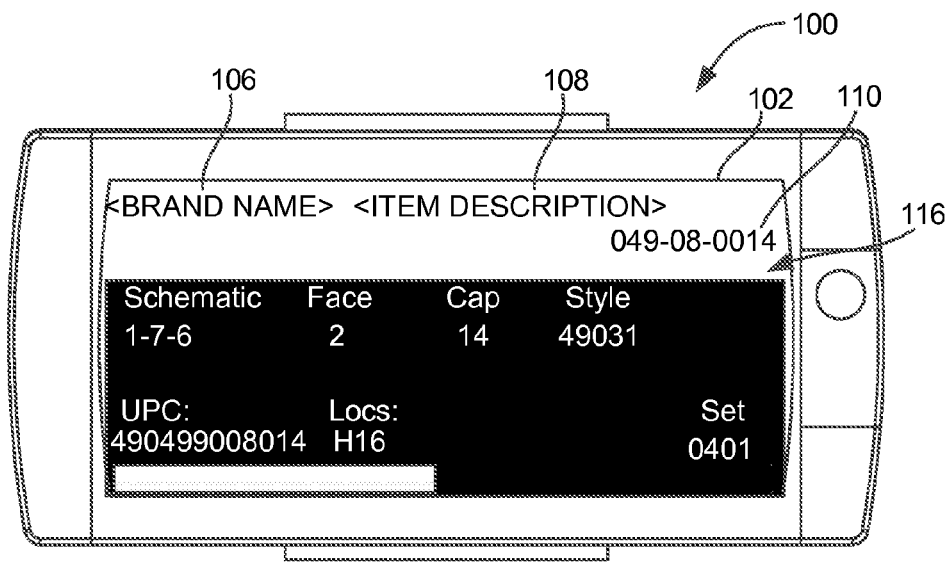
FIG. 18 illustrates a front view of an exemplary electronic price label showing an inventory shortage on a detailed screen on its display.

If the quantity of the retrieved item is greater than one at step 502, the process continues at block 506 where store server 224 instructs EPL server 228, and therefore the EPL associated with the item, to change its display to indicate an inventory shortage. FIG. 17 illustrates exemplary EPL 100 where display 102 illustrates summary screen 114 showing an inventory shortage for the item identified by item identifier 110, brand name 106, item description 108 and bar code 112. More particularly, compared to summary screen 114 illustrated in FIG. 1, in FIG. 17, item identifier 110 is highlighted using a darkened background and light text. This indicates that there is an inventory shortage for this item. Inventory shortage can also be shown on detailed screen 116. As illustrated in FIG. 18, an inventory shortage is illustrated on display 102 of exemplary EPL 100 by darkening the background of a portion of the display including darkening the background around the item placement information, UPC and store location information while showing that information in light text.

At block 508, store server 224 determines if there are more items in the database that are associated with an EPL. If so, the flow diagram proceeds back to block 500 to retrieve another item in the inventory database that is associated with a different EPL. If not, the flow diagram ends.

Figure 19:
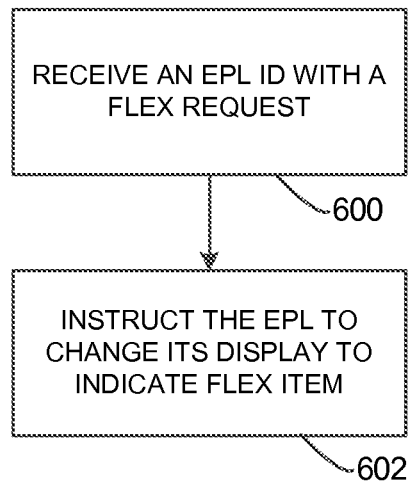
FIG. 19 is a flow diagram illustrating a method of managing inventory in a store using the system illustrated in FIG. 3 according to one embodiment.

FIG. 19 illustrates a flow diagram of a method implemented by store server 224 for managing inventory in a business or retail store using EPL system 222 according to another embodiment. In particular, FIG. 19 illustrates a method of changing an EPL screen to reflect a flex item. In certain instances, an item located in a position in the store is out-of-stock and more stock will not be available for some time or more stock will never become available. Until additional stock arrives or until new items or a change in items on the planogram takes place, there will be an empty space in this location of the store. To temporarily fill the space, the missing item is "flexed." In other words, product from the item adjacent to the item that is out-of-stock is moved over to fill in the empty space. The flow diagram in FIG. 19 illustrates the steps for flexing an item.

At block 600, store server 224 receives an EPL ID with a flex request from handheld device 227. The flex request is produced by EPL application 252 in response to a user selecting an item to flex on hand held device 227. In particular, EPL application 252 first displays a user interface (not illustrated) on display 248 of handheld device 227 that allows the user to indicate that they wish to perform a flex operation. After the user indicates that they want to perform a flex operation, EPL application 252 displays a user interface (not illustrated) on display 248 for entering the EPL ID of the item to be flexed. As previously discussed, the EPL ID can be scanned from a bar code printed on a tag attached to the back of the EPL. EPL application 252 then forwards a flex request with the EPL ID to store server 224.

Figure 20:
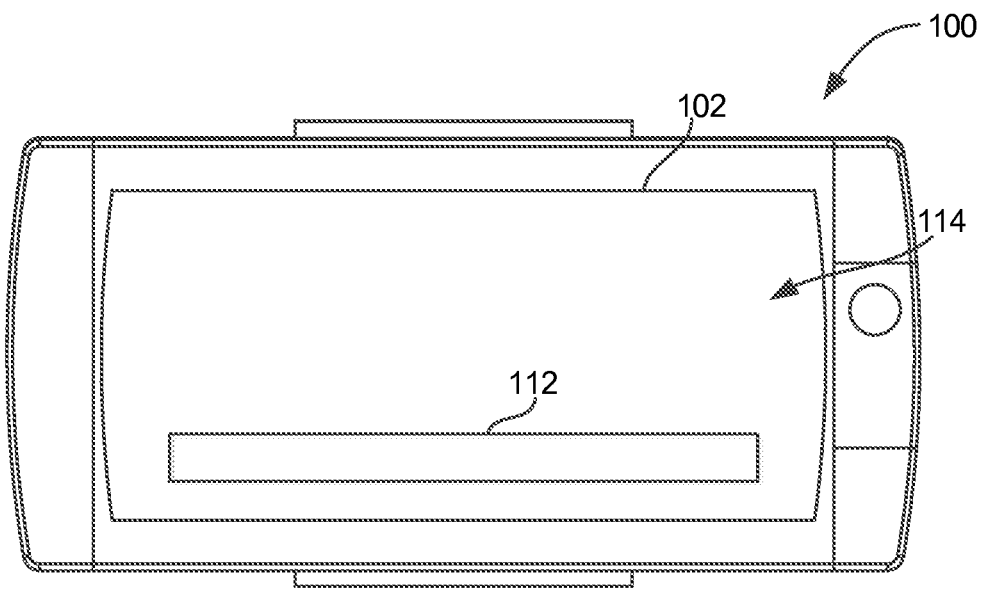
FIG. 20 illustrates a front view of an exemplary electronic price label showing a flex item on a summary screen on its display.

At block 602, store server 224 instructs EPL server 228 and therefore the EPL associated with the item to change its display to indicate a flex item. FIG. 20 illustrates exemplary EPL 100 where display 102 illustrates a summary screen 114 showing that the item has been flexed. In particular, summary screen 114 of display 102, which is shown to customers during normal business hours, is rendered blank except for bar code 112, which is a representation of the original item's item identifier.

Figure 21:
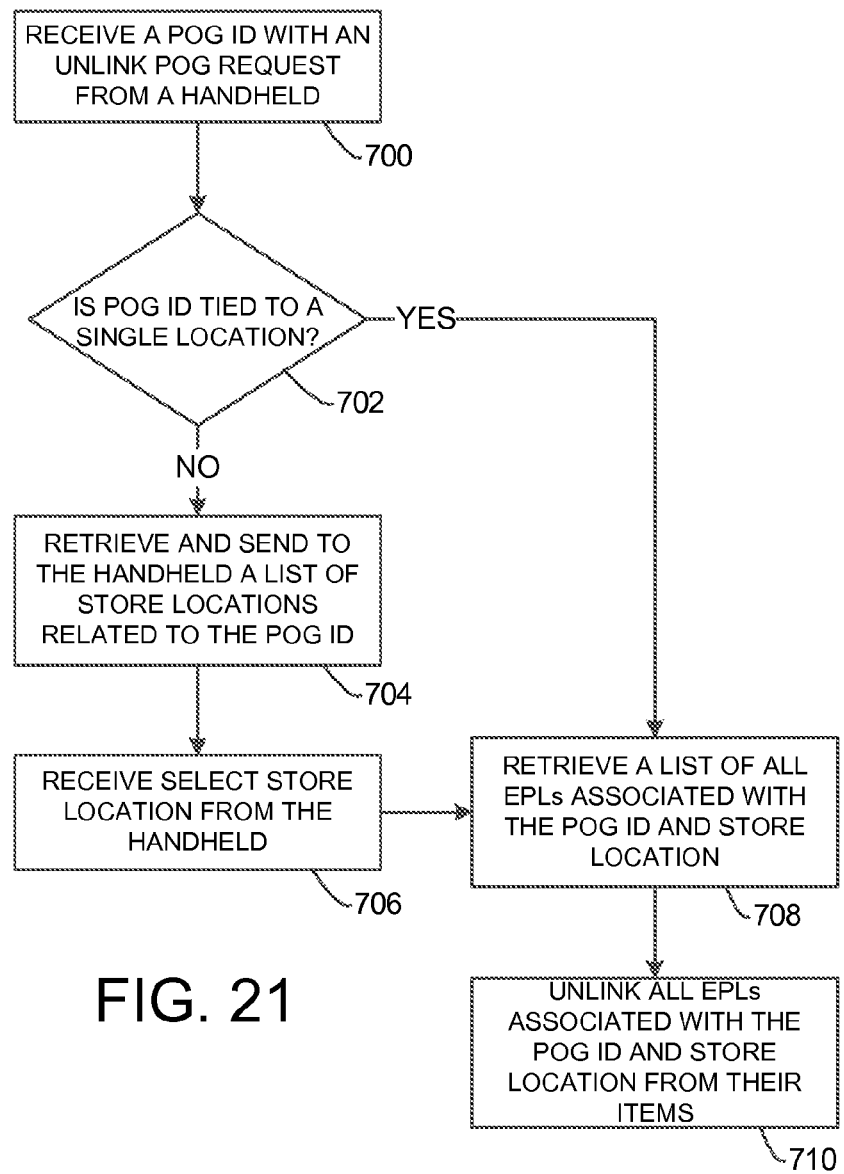
FIG. 21 is a flow diagram illustrating a method of managing inventory in a store using the system illustrated in FIG. 3 according to one embodiment.

FIG. 21 illustrates a flow diagram of a method implemented by store server 224 for managing product positioning in a business or retail store using EPL system 222 according to another embodiment. In particular, FIG. 21 illustrates a method of simultaneously unlinking all EPLs associated with a POG ID. In some instances, it is desirous to simultaneously unlink all EPLs that correspond to a POG ID. For example, if a location in a store requires the change out of a POG or if there are too many changes to the POG to make processing as a revision complex and confusing, a user may want to unlink all of the EPLs assigned to a POG ID and reset the location in the store by starting over and performing a transition.

At block 700, store server 224 receives a POG ID with an unlink POG request from handheld device 227. At block 702, store server determines whether the POG ID is tied to a single location in the store. If the POG ID is tied to multiple locations (i.e., the POG is used in multiple block, aisle and aisle sections through the store), the flow diagram proceeds to block 704. At block 704, store server 224 retrieves a list of store locations related to the received POG ID from store POG application and database 246 and sends the list to handheld device 227. At block 706, store server 224 receives a select store location from the list of store locations from handheld device 227. If the POG ID is tied to only a single location, the flow diagram proceeds directly from block 702 to block 708. If the POG ID is tied to a single location or if store server 224 has received a select store location from a list of store locations, store server 224 retrieves a list of all EPLs associated with the POG ID and store location from store POG application and database 246. At block 710, store server unlinks each EPL in the list of EPLs from their items.

An exemplary of a computing device that can be used in the various server embodiments described above is shown in the block diagram of FIG. 22. The computing device 10 of FIG. 22 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, non-volatile solid-state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid-state memory and external memory devices and their associated computer-readable media provide nonvolatile storage media for the computing device 10 on which computer-executable instructions and computer-readable data structures may be stored. Such computer-executable instructions can include instructions for performing any of the steps described in the methods above. Other types of media that are readable by a computer may also be used in the exemplary operation environment.

A number of program modules may be stored in the drives, solid state memory and RAM 20, including an operating system 38, one or more application programs 40, other program modules 42 and program data 44. In particular, application programs 40 may include store POG application 246, store inventory application 244, store price application 242, central POG application 240, central inventory application 238, central price application 236, and EPL application 252. Program data 44 may include data stored in any of the databases or tables discussed above including store POG database 246, store inventory database 244, store price database 242, central POG database 240, central inventory database 238, and central price database 236.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 22. The network connections depicted in FIG. 22 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

Figure 22:
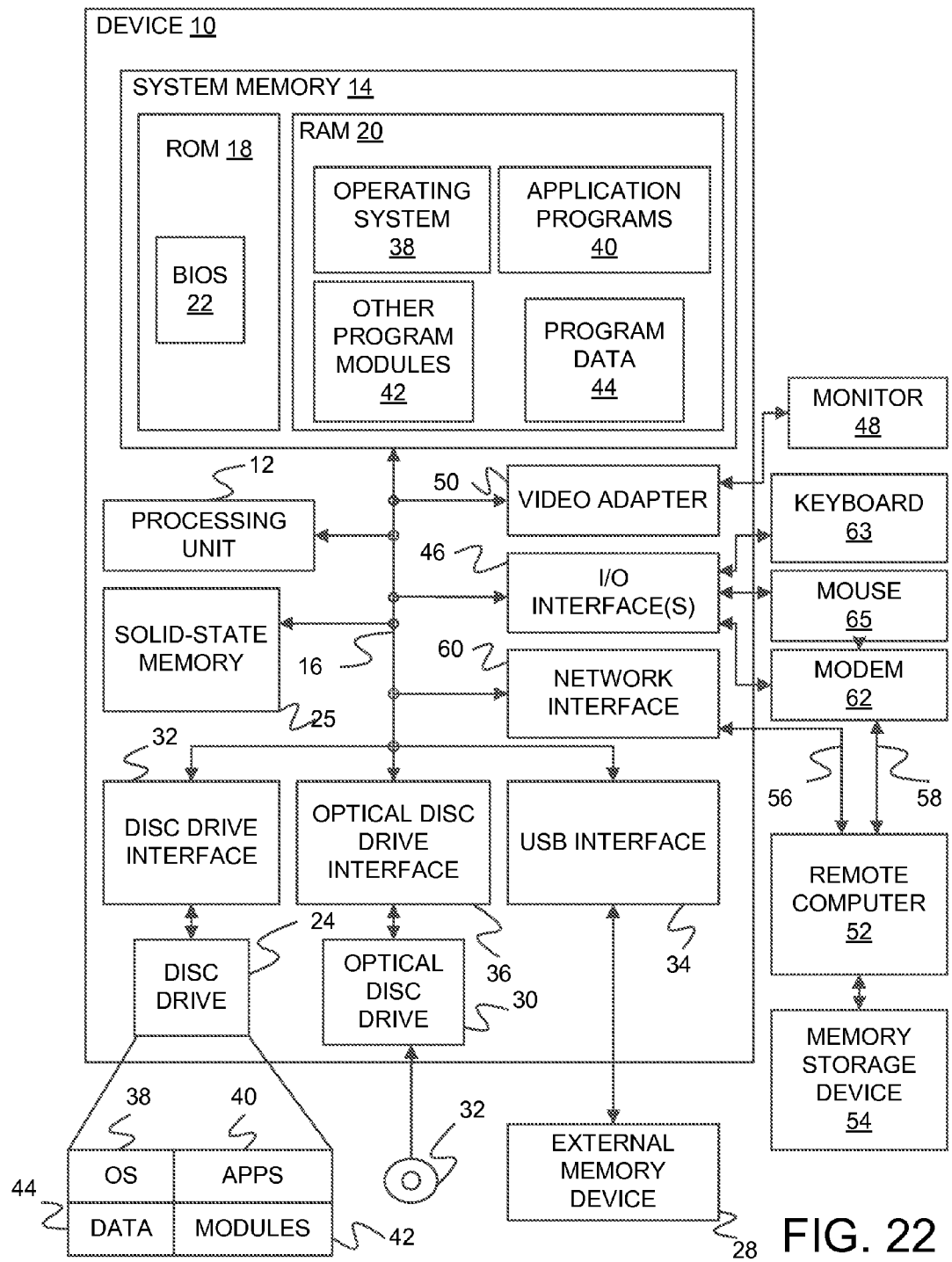
FIG. 22 is a block diagram of a computing device that may be used in accordance with the various server embodiments.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 22 are exemplary and other means for establishing a communications link between the computers, such as a wireless interface communications link, may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer implemented method of managing electronic price label placement in a retail store during a planogram transition, the method comprising:
   receiving, by a processor, a planogram identifier with a request to access a planogram and a store location from a handheld device;
   determining, by the processor, that the planogram identifier and the store location corresponds with a transition of the planogram where all electronic price labels in the planogram need to be relinked to new items;
   sending, by the processor, a count of electronic price labels needed in a select portion of the planogram to the handheld device;
   receiving, by the processor, an electronic price label identifier for each of a quantity of electronic price labels equal to the count from the handheld device;
   linking, by the processor, each new item in the select portion of the planogram with one of the electronic price label identifiers of the quantity of electronic price labels; and
   sending, by the processor, placement information to each electronic price label in the count, the placement information corresponding with the linked item and being configured to be rendered on a display of each electronic price label.

2. The method of claim 1, wherein the placement information comprises a schematic identifier indicative of a section of the planogram, a shelf or a peg in the section of the planogram and a position of the linked item in the shelf or the peg in the section of the planogram.

3. The method of claim 1, wherein the placement information comprises a distance the electronic price label is to be placed on a shelf of a display fixture relative to an edge of the display fixture or a distance a peg is to be placed on the display fixture relative to a bottom of the display fixture.

4. The method of claim 1, wherein the select portion of the planogram is determined by:
   retrieving, by the processor, a list of sections corresponding to the received planogram identifier; and
   sending, by the processor, the list of sections to the handheld device for rendering on a display of the handheld device.

5. The method of claim 4, wherein the select portion of the planogram is determined by receiving, by the handheld device, one of the sections from the list.

6. The method of claim 5, wherein the select portion of the planogram is determined by
   retrieving, by the processor, a list of shelves or pegs corresponding to the received section from the list; and
   sending, by the processor, the list of shelves or pegs to the handheld device for rendering on the display of the handheld device.

7. A computer implemented method of managing electronic price label placement in a retail store during a planogram revision, the method comprising:
   receiving, by a processor, a planogram identifier with a request to access a planogram and a store location from a handheld device;
   determining, by the processor, that the planogram identifier and store location corresponds with a revision of the planogram where some but not all electronic price labels in the planogram need to be at least one of removed, replaced or added;
   comparing, by the processor, a count of existing electronic price labels in the planogram with a new count of electronic price labels in the revised planogram to determine a net increase in electronic price labels needed in the revised planogram;

sending, by the processor, a count of the net increase of electronic price labels in the revision of the planogram to a handheld device;

receiving, by the processor, a new electronic price label identifier for each electronic price label in the count of the net increase of electronic prices labels from the handheld device;

linking, by the processor, each existing electronic price label and each new electronic price label to a respective item in the revised planogram; and sending, by the processor, placement information to each existing electronic price label and to each new electronic price label, the placement information corresponding with the linked item and configured to be rendered on a display of the electronic price label.

8. The method of claim 7, wherein the placement information comprises a schematic identifier indicative of a section of the planogram, a shelf or peg in the section of the planogram and a position of the item on the shelf or the peg in the section of the planogram.

9. The method of claim 7 wherein the placement information comprises a distance for positioning an electronic price label.

10. The method of claim 7, further comprising unlinking, by the processor, one of the items from one of the existing electronic price labels where the existing electronic price label is indicated in the revised planogram as to be removed.

11. A computer system that manages electronic price label placement in a retail store during a planogram transition or revision, the system comprising:

a handheld device;

a plurality of electronic price labels;

a store server configured to access program modules related to price information, placement information and inventory information and being in wireless communication with the handheld device; and an electronic price label server wirelessly connected to the plurality of electronic price labels, the electronic price label server configured to relay information from the store server indicative of the price information, the placement information including instructions indicative of where each electronic price label is to be placed and the inventory information to the plurality of electronic price labels such that the price information, the placement information and the inventory information is renderable on a display for each of the plurality of electronic price labels;

wherein when the store server receives from the handheld device a planogram identifier with a request to access a planogram that corresponds with a planogram that requires revision or transition the store server sends a count of electronic price labels to the handheld device that are needed for the planogram;

wherein upon receipt of the count of electronic price labels the handheld device sends an electronic price label identifier for each of a quantity of electronic price labels that equal to the count; and wherein the store server links each item in the planogram with one of the electronic price label identifiers and sends the price information, the placement information and the inventory information via the electronic price label server to the electronic price labels associated with the electronic price label identifiers.

12. The computer system of claim 11, wherein the inventory information comprises information for a summary screen that is shown to customers on the display of each electronic price label during a particular time period, the summary screen including a single barcode that corresponds to an item identifier of the item of each associated electronic price label.

13. The computer system of claim 11, wherein the inventory information comprises information for a summary screen that is shown to customers on the display of each electronic price label during a particular time period, the summary screen including a graphical representation that indicates an inventory shortage of the item of each associated electronic price label.

14. The computer system of claim 11, wherein the store server is further configured to unlink each item in a planogram from their associated electronic price labels.

15. The computer system of claim 11, wherein when the planogram corresponds with a planogram that requires revision, the store server compares a count of existing electronic price labels in the planogram with a new count of electronic price labels in the revision of the planogram to determine a net increase in electronic price labels needed in the revision of the planogram.

16. The computer system of claim 11, wherein the instructions indicative of a distance each electronic price label is to be placed relative to an edge of a display fixture comprises instructions indicative of a distance each electronic place label is to be placed from an edge of a shelf.

17. The computer system of claim 11, wherein the instructions indicative of a distance each electronic price label is to be placed relative to an edge of a display fixture comprises instructions indicative of a distance each electronic place label is to be placed from a bottom of the display fixture.

* * * * *